(12) United States Patent
Gross et al.

(10) Patent No.: US 8,046,637 B2
(45) Date of Patent: Oct. 25, 2011

(54) TELEMETRY DATA FILTERING THROUGH SEQUENTIAL ANALYSIS

(75) Inventors: Kenny C. Gross, San Diego, CA (US); Kalyanaraman Vaidyanathan, San Diego, CA (US); Michelle C. Murrett, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 291 days.

(21) Appl. No.: 12/399,655

(22) Filed: Mar. 6, 2009

(65) Prior Publication Data

US 2010/0229023 A1 Sep. 9, 2010

(51) Int. Cl.
*G06F 11/00* (2006.01)
(52) U.S. Cl. ............................................ 714/26; 714/37
(58) Field of Classification Search ............... 714/26, 714/47, 27, 37, 48, 47.1, 47.2, 47.3
See application file for complete search history.

(56) References Cited

U.S. PATENT DOCUMENTS

| 7,181,651 B2 * | 2/2007 | Gross et al. ..................... 714/37 |
| 2002/0091499 A1 * | 7/2002 | Wegerich et al. ............. 702/182 |
| 2002/0183866 A1 * | 12/2002 | Dean et al. ....................... 700/26 |
| 2003/0065986 A1 * | 4/2003 | Fraenkel et al. ................. 714/47 |
| 2007/0220368 A1 * | 9/2007 | Jaw et al. ......................... 714/48 |

* cited by examiner

*Primary Examiner* — Philip Guyton
*Assistant Examiner* — Joseph Kudirka
(74) *Attorney, Agent, or Firm* — Park, Vaughan, Fleming & Dowler LLP; Chia-Hsin Suen (57) ABSTRACT

One embodiment provides a system that analyzes telemetry data from a computer system. During operation, the system periodically obtains the telemetry data from the computer system. Next, the system preprocesses the telemetry data using a sequential-analysis technique. If a statistical deviation is found in the telemetry data using the sequential-analysis technique, the system identifies a subset of the telemetry data associated with the statistical deviation and applies a root-cause-analysis technique to the subset of the telemetry data to determine a source of the statistical deviation. Finally, the system uses the source of the statistical deviation to perform a remedial action for the computer system, which involves correcting a fault in the computer system corresponding to the source of the statistical deviation.

16 Claims, 5 Drawing Sheets

TELEMETRY DATA FILTERING THROUGH SEQUENTIAL ANALYSIS

BACKGROUND

1. Field

The present embodiments relate to techniques for analyzing telemetry data. More specifically, the present embodiments relate to a method and system for filtering telemetry data through sequential analysis.

2. Related Art

As electronic commerce becomes more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is important to ensure high availability in such enterprise computing systems.

To achieve high availability, it is necessary to be able to capture unambiguous diagnostic information that can quickly locate faults in hardware or software. If systems perform too little event monitoring, when a problem crops up at a customer site, service engineers may be unable to quickly identify the source of the problem. This can lead to increased down time.

Fortunately, high-end computer servers are now equipped with a large number of sensors that measure physical performance parameters such as temperature, voltage, current, vibration, and acoustics. Software-based monitoring mechanisms also monitor software-related performance parameters, such as processor load, memory and cache usage, system throughput, queue lengths, I/O traffic, and quality of service. Typically, special software analyzes the collected telemetry data and issues alerts when there is an anomaly. In addition, it is important to archive historical telemetry data to allow long-term monitoring and to facilitate detection of slow system degradation.

However, the increased collection of telemetry data from computer servers has resulted in higher computational costs associated with analyzing the telemetry data. Such computational costs typically arise from the application of statistical-analysis techniques, including regression analysis and/or estimation techniques, to the telemetry data. While statistical-analysis techniques may allow anomalies in the computer servers to be identified and diagnosed, the computational costs may become unmanageable as increasing numbers of servers and components are deployed and monitored in production and an increasing density of sensors is used to monitor the components in each server.

On the other hand, highly available systems may only experience disturbances in performance a small fraction of the time. The vast majority of telemetry data collected from modern computer servers may thus represent normal functioning of the computer servers and display the same statistical quality indicators over time. As a result, constant application of computationally intensive statistical-analysis techniques to identify anomalies in the telemetry data may be both unnecessary and wasteful.

Hence, what is needed is a mechanism for reducing computational costs associated with analyzing telemetry data from computer servers.

SUMMARY

One embodiment provides a system that analyzes telemetry data from a computer system. During operation, the system periodically obtains the telemetry data from the computer system. Next, the system preprocesses the telemetry data using a sequential-analysis technique. If a statistical deviation is found in the telemetry data using the sequential-analysis technique, the system identifies a subset of the telemetry data associated with the statistical deviation and applies a root-cause-analysis technique to the subset of the telemetry data to determine a source of the statistical deviation. Finally, the system uses the source of the statistical deviation to perform a remedial action for the computer system which involves correcting a fault in the computer system corresponding to the source of the statistical deviation.

In some embodiments, applying the sequential-analysis technique to the subset of the telemetry data involves analyzing a set of summary statistics obtained from the telemetry data.

In some embodiments, the root-cause-analysis technique is associated with a higher computational cost than the sequential-analysis technique.

In some embodiments, the sequential-analysis technique corresponds to a sequential probability ratio test.

In some embodiments, the root-cause-analysis technique corresponds to a multivariate state estimation technique.

In some embodiments, the source of the statistical deviation is determined from one or more residuals produced from the multivariate state estimation technique.

In some embodiments, the telemetry data includes at least one of a load metric, a CPU utilization, an idle time, a memory utilization, a disk activity, a transaction latency, a temperature, a voltage, a fan speed and a current.

In some embodiments, using the source of the statistical deviation to perform the remedial action for the computer system additionally involves at least one of generating a replacement signal to maintain normal operation in the computer system and identifying a degradation mode of the computer system.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 1:
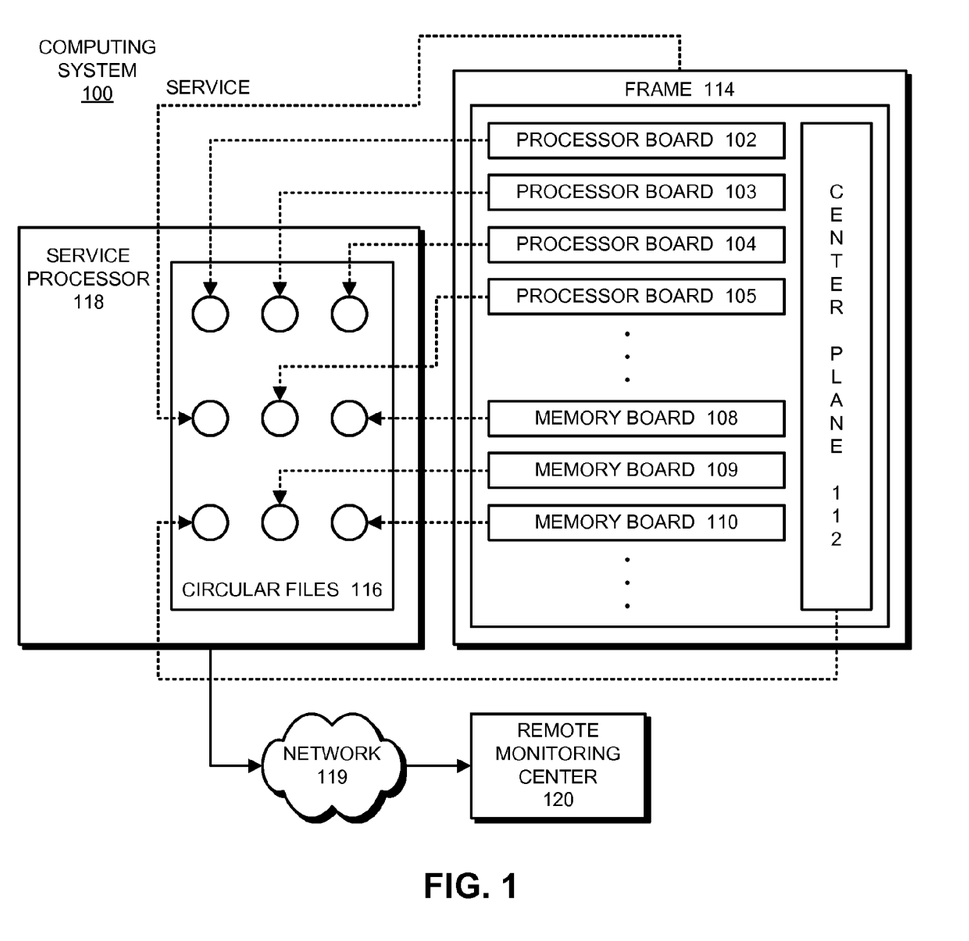
FIG. 1 shows a computer system which includes a service processor for processing telemetry signals in accordance with an embodiment.

FIG. 1 shows a computer system which includes a service processor for processing telemetry signals in accordance with an embodiment. As is illustrated in FIG. 1, computer system 100 includes a number of processor boards 102-105 and a number of memory boards 108-110, which communicate with each other through center plane 112. These system components are all housed within a frame 114.

In one or more embodiments, these system components and frame 114 are all "field replaceable units" (FRUs), which are independently monitored as is described below. Note that all major system units, including both hardware and software, can be decomposed into FRUs. For example, a software FRU can include an operating system, a middleware component, a database, or an application.

Computer system 100 is associated with a service processor 118, which can be located within computer system 100, or alternatively can be located in a standalone unit separate from computer system 100. For example, service processor 118 may correspond to a portable computing device, such as a mobile phone, laptop computer, personal digital assistant (PDA), and/or portable media player. Service processor 118 may include a monitoring mechanism that performs a number of diagnostic functions for computer system 100. One of these diagnostic functions involves recording performance parameters from the various FRUs within computer system 100 into a set of circular files 116 located within service processor 118. In one embodiment of the present invention, the performance parameters are recorded from telemetry signals generated from hardware sensors and software monitors within computer system 100. In one or more embodiments, a dedicated circular file is created and used for each FRU within computer system 100. Note that this circular file can have a three-stage structure as is described below with reference to FIG. 2.

The contents of one or more of these circular files 116 can be transferred across network 119 to remote monitoring center 120 for diagnostic purposes. Network 119 can generally include any type of wired or wireless communication channel capable of coupling together computing nodes. This includes, but is not limited to, a local area network (LAN), a wide area network (WAN), a wireless network, and/or a combination of networks. In one or more embodiments, network 119 includes the Internet. Upon receiving one or more circular files 116, remote monitoring center 120 may perform various diagnostic functions on computing system 100, as described below with respect to FIGS. 2-3. The system of FIG. 1 is described further in U.S. Pat. No. 7,020,802 (issued Mar. 28, 2006), by inventors Kenny C, Gross and Larry G. Votta, Jr., entitled "Method and Apparatus for Monitoring and Recording Computer System Performance Parameters" and incorporated herein by reference.

Figure 2:
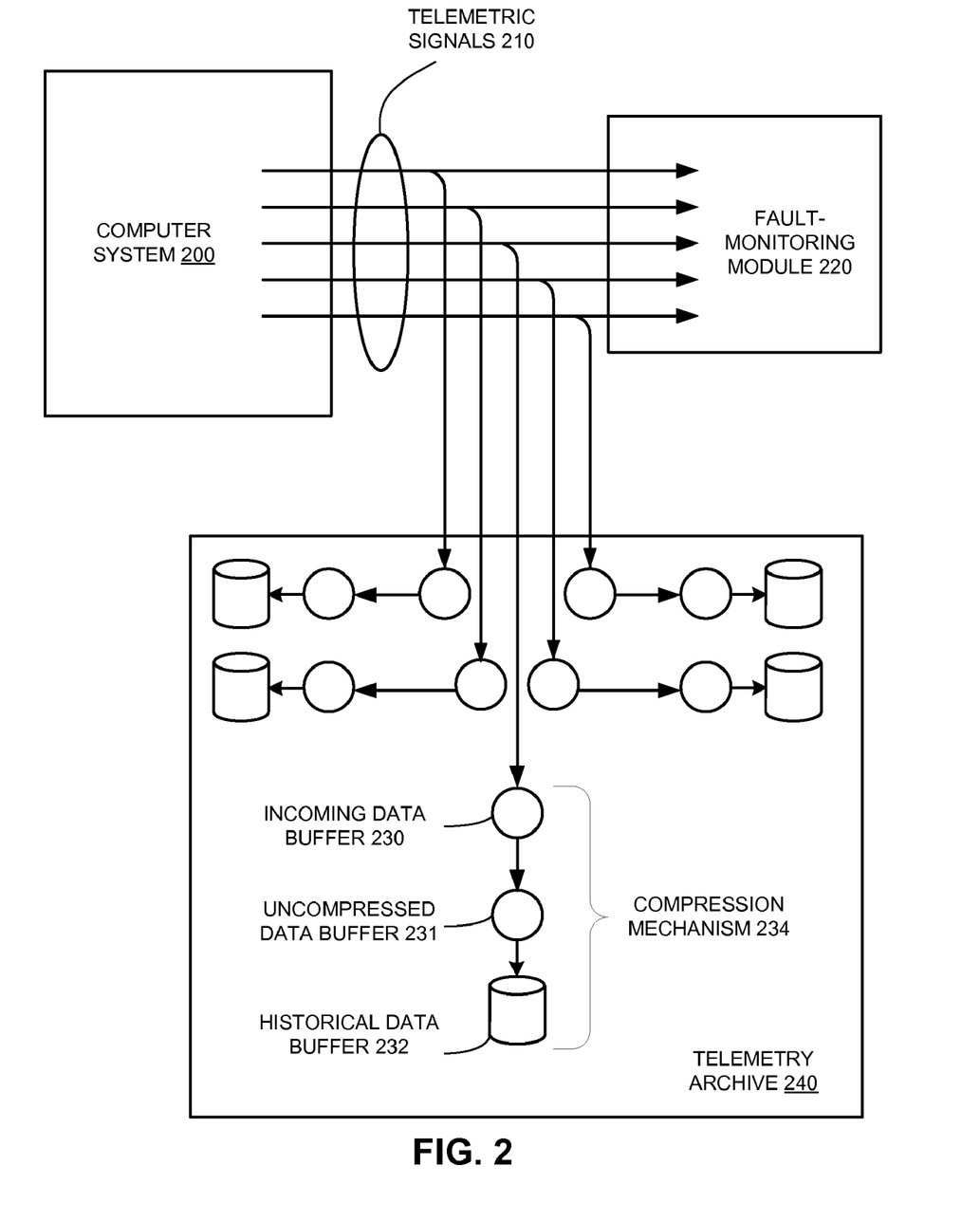
FIG. 2 shows a telemetry data archiving system which records both short-term, real-time telemetry data and long-term, historical telemetry data in accordance with an embodiment.

FIG. 2 illustrates a telemetry data archiving system which records both short-term real-time telemetry data and long-term historical telemetry data in accordance with an embodiment of the present invention. In this example, computer system 200 is monitored with a number of telemetric signals 210, which are transmitted to a fault-monitoring module 220. Fault-monitoring module 220 analyzes telemetric signals 210 and issues alerts when there is an anomaly.

Telemetric signals 210 are also sent to a telemetry archive 240. Telemetric signals 210 may include, for example, load metrics, central processing unit (CPU) utilizations, idle times, memory utilizations, disk activities, transaction latencies, temperatures, voltages, fan speeds, and/or currents monitored from the computer system(s). Within telemetry archive 240, each telemetric signal is recorded first in an incoming data buffer 230, then in an uncompressed data buffer 231, and subsequently in a historical data buffer 232. As shown in FIG. 2, incoming data buffer 230 saves the real-time data of one of the telemetric signals. When incoming data buffer 230 is full, its data is transferred to uncompressed data buffer 231 to allow additional incoming data to be stored in incoming data buffer 230. To make room for data from incoming data buffer 230, older data from uncompressed data buffer 231 is consolidated and transferred to historical data buffer 232. Because both incoming data buffer 230 and uncompressed data buffer 231 store raw, recently collected telemetry data, both buffers may be referred to as "current data buffers."

In one or more embodiments, incoming data buffer 230, uncompressed data buffer 231, and historical data buffer 232 are stored on a storage device (not shown). Note that the storage device can include any type of non-volatile storage device that can be coupled to a computer system. This includes, but is not limited to, magnetic, optical, and magneto-optical storage devices, as well as storage devices based on flash memory and/or battery-backed up memory.

In one or more embodiments, a compression mechanism 234 compresses the data stored in uncompressed data buffer 231 before the data is transferred to historical data buffer 232. In addition, compression mechanism 234 compresses the data in historical data buffer 232 to make space for the compressed data from uncompressed data buffer 231. In one embodiment of the present invention, compression mechanism 234 divides raw telemetry data from uncompressed data buffer 231 into a series of time intervals. Compression mechanism 234 then calculates a set of summary statistics for the telemetry data samples in each time interval. In one or more embodiments of the invention, the summary statistics calculated for each time interval include a start timestamp, a stop timestamp, a number of samples, a minimum value, a maximum value, a first value, a last value, a first moment, a second moment, a third moment, a fourth moment, and a whiteness metric. The summary statistics may then be stored in historical data buffer 232, along with further-compressed summary statistics from older time intervals.

In addition, compression mechanism 234 may compress the summary statistics in historical data buffer 232 by merging the summary statistics of adjacent time intervals into a single set of summary statistics for a single, longer time interval. In one or more embodiments, pairs of adjacent intervals in historical data buffer 232 are merged such that the length of the time intervals is doubled and the number of time intervals is halved after compression. Those skilled in the art will appreciate that the time intervals may also be merged in threes, fours, and/or other numbers of adjacent intervals to optimize the storage of telemetry data in accordance with one or more embodiments of the invention.

Figure 3:
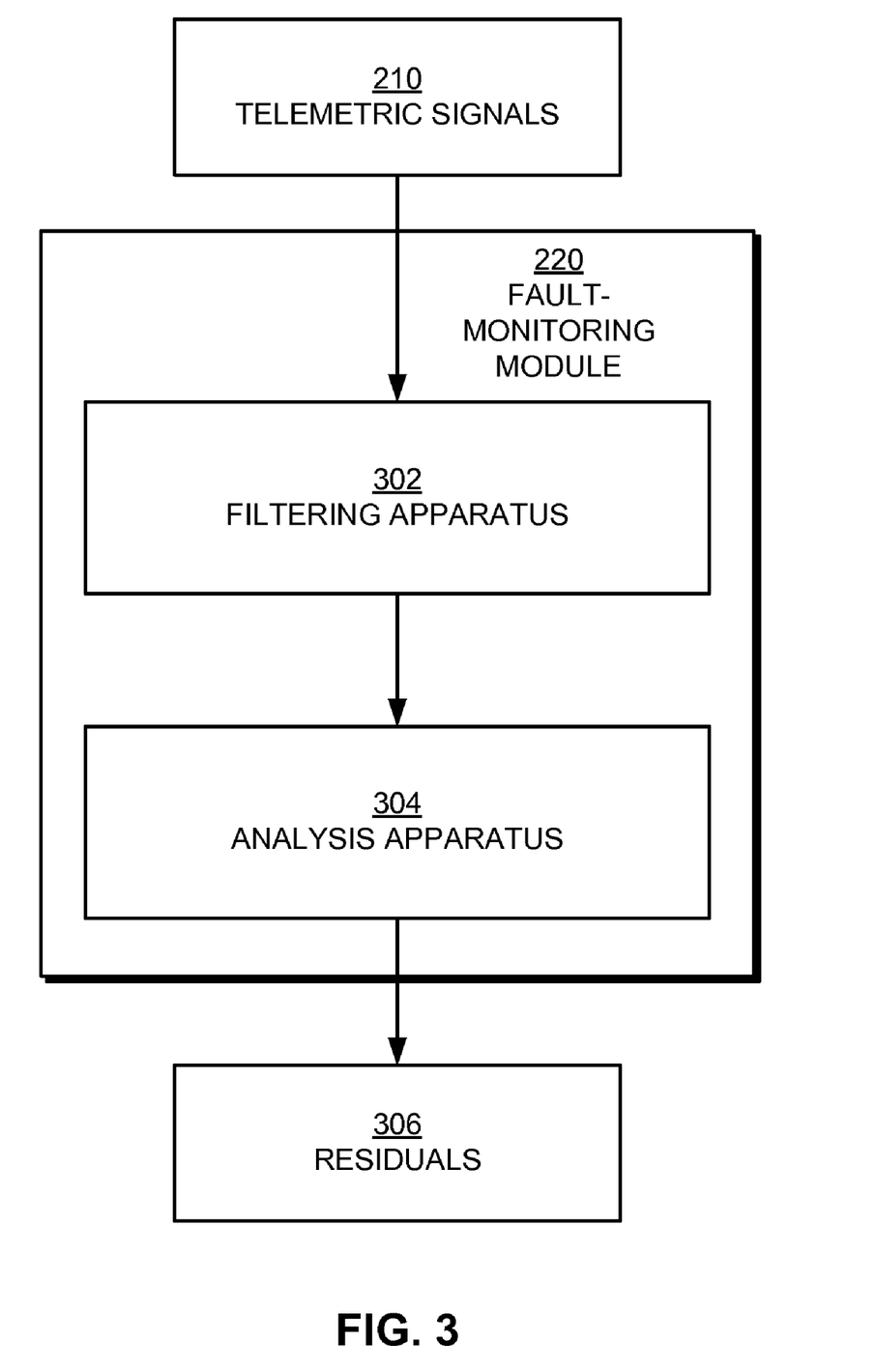
FIG. 3 shows a fault monitoring module in accordance with an embodiment.

FIG. 3 shows fault-monitoring module 220 in accordance with an embodiment. As described above, fault-monitoring module 220 may analyze telemetry data (e.g., telemetric signals 210) from one or more computer systems and issue alerts when an anomaly is detected. Fault-monitoring module 220 may further be provided by and/or implemented using a service processor associated with the computer system(s). Moreover, fault-monitoring module 220 may include functionality to analyze both real-time telemetric signals 210 and long-term historical telemetry data. For example, fault-monitoring module 220 may be used to detect anomalies in telemetric signals 210 received directly from the monitored computer system(s). Fault-monitoring module 220 may also be used in offline detection of anomalies from the monitored computer system(s) by processing archived and/or compressed telemetry data (e.g., from telemetry archive 240 in FIG. 2) associated with the monitored computer system(s).

Those skilled in the art will appreciate that high-availability computer systems (e.g., servers) may exhibit anomalous behavior only a small fraction of the time. For example, a server with "five nines" (e.g., 99.999%) availability may experience down time from errors, failures, degradation, and/or other issues for roughly 5.26 minutes per year. Consequently, the vast majority of telemetry data provided to fault-monitoring module 220 may be representative of normal operation in the monitored computer system(s). Such telemetry data may further correspond to time series signals that maintain the same statistical values over a variety of time scales. For example, telemetric signals 210 from a normally operating server may display the same mean, variance, skewness, kurtosis, range of values, and/or degree of serial correlation over a week, month, or year.

As a result, constantly and/or routinely applying computationally intensive statistical-analysis techniques (e.g., regression analysis, estimation techniques, etc.) to telemetric signals 210 may be inefficient, impractical, and/or unnecessary. Instead, fault-monitoring module 220 may analyze telemetric signals 210 in one of two analysis modes. As discussed below, the use of both analysis modes may reduce computational cost in identifying anomalous behavior in the monitored computer system(s).

As shown in FIG. 3, fault-monitoring module 220 includes a filtering apparatus 302 and an analysis apparatus 304. In one or more embodiments, filtering apparatus 302 receives and preprocesses telemetric signals 210 using a sequential-analysis technique to detect statistical deviations in telemetric signals 210. For example, filtering apparatus 302 may analyze telemetric signals 210 for changes in the mean, variance, range of values, whiteness metric, and/or other statistical quality indicators (e.g., summary statistics) associated with telemetric signals 210. If filtering apparatus 302 finds a statistical deviation in telemetric signals 210, filtering apparatus 302 generates an alert. Continual generation of alerts by filtering apparatus 302 may further trigger the processing of telemetry signals 210 by analysis apparatus 304 using a root-cause-analysis technique. The root-cause-analysis technique may produce a set of residuals 306, which may additionally be used by analysis apparatus 304 to determine a source of the statistical deviation.

In one or more embodiments, the sequential-analysis technique used by filtering apparatus 302 corresponds to a sequential probability ratio test (SPRT). To apply the SPRT to telemetric signals 210, filtering apparatus 302 may include, as hypotheses, a false-alarm probability and a missed-alarm probability, with an indifference region between the false-alarm probability and the missed-alarm probability. Both hypotheses may be configured based on historical telemetry data associated with the monitored computer system(s) and/or similar computer systems. Furthermore, one or both hypotheses may be used to adjust the sensitivity of fault-monitoring module 220 to false positives or false negatives in detecting anomalous behavior from the monitored computer system(s).

The assessment of statistical deviations in the monitored computer system(s) by filtering apparatus 302 may also be based on the historical telemetry data. More specifically, filtering apparatus 302 may use the SPRT to compare time series data corresponding to recently received telemetry signals 210 from the monitored computer system(s) with historical telemetry data from the monitored computer system(s) and/or similar computer systems. Filtering apparatus 302 may then generate an alert if the recently received telemetry signals 210 differ statistically from the historical telemetry data. For example, filtering apparatus 302 may generate an alert if the recently received telemetry signals 210 correspond to a distribution with a higher or lower mean and/or larger or smaller levels of variability (e.g., spikiness, burstiness, thrashing, cycling, etc.) than the historical telemetry data.

The false-alarm probability used in the SPRT may correspond to the probability and/or frequency of false alarms in identifying statistical deviations in telemetric signals 210. For example, if the false-alarm probability is set to one in 1000 observations, an alert frequency of one in 1000 observations or fewer may indicate that the monitored computer system(s) are functioning normally. In other words, the monitored computer system(s) are functioning within normal ranges if filtering apparatus 302 generates an alert based on a detected statistical deviation as specified by the false-alarm probability (e.g., one in 1000 observations).

Similarly, the missed-alarm probability used in the SPRT may represent a threshold beyond which the alert frequency may indicate anomalous behavior in the monitored computer system(s). For example, if the missed-alarm probability is set to five in 1000 observations, an alert frequency at or above five in 1000 observations may indicate that the monitored computer system(s) are exhibiting anomalous (e.g., abnormal) behavior. In other words, telemetric signals 210 may be sent to analysis apparatus 304 for root-cause analysis if the frequency of alerts generated by filtering apparatus 302 reaches or exceeds the missed-alarm probability. Furthermore, alert frequencies between the false-alarm probability and missed-alarm probability may indicate false alarms or missed alarms; in such cases, telemetric signals 210 may continue to be monitored until the alert frequency is resolved to be either a series of false alarms or a series of missed alarms.

In one or more embodiments, the root-cause-analysis technique used by analysis apparatus 304 corresponds to a multivariate state estimation technique (MSET). In other words, analysis apparatus 304 may apply nonlinear, nonparametric regression analysis to telemetric signals 210 to determine the source of the statistical deviation as detected in filtering apparatus 302. As with filtering apparatus 302, analysis apparatus 304 may be configured using historical telemetry data from normally functioning computer systems similar to the monitored computer system(s). In particular, analysis apparatus 304 may be trained using the historical telemetry data to determine correlations among the various telemetric signals 210 collected from the monitored computer system(s) and to generate accurate estimates of each telemetric signal based on the latest set of telemetric signals 210 and the previously determined correlations between the telemetric signals.

Once filtering apparatus 302 detects a statistical deviation in telemetric signals 210 at a rate above the missed-alarm probability, analysis apparatus 304 may use MSET to generate estimates of telemetric signals 210 based on the current set of telemetric signals 210 (e.g., the subset of telemetric signals 210 associated with the statistical deviation). Analysis apparatus 304 may then obtain residuals 306 by subtracting the estimated telemetric signals from the measured telemetric signals 210. In other words, residuals 306 may represent the deviation of the monitored computer system(s) from normal operating configurations. Analysis apparatus 304 may then analyze residuals 306 to determine the source(s) of the statistical deviation. For example, analysis apparatus 304 may also employ SPRT to detect anomalies in individual telemetric signals and resolve the sources of the anomalies using correlations between signals found during the training stage of MSET.

In one or more embodiments, the nonlinear nonparametric regression technique used in analysis apparatus 304 may refer to any number of pattern recognition algorithms. For example, see [Gribok] "Use of Kernel Based Techniques for Sensor Validation in Nuclear Power Plants," by Andrei V. Gribok, J. Wesley 20 Hines, and Robert E. Uhrig, The Third American Nuclear Society International Topical Meeting on Nuclear Plant Instrumentation and Control and Human-Machine Interface Technologies, Washington D.C., Nov. 13-17, 2000. This paper outlines several different pattern recognition approaches. Hence, the term "MSET" as used in this specification can refer to (among other things) any 25 techniques outlined in [Gribok], including Ordinary Least Squares (OLS), Support Vector Machines (SVM), Artificial Neural Networks (ANNs), MSET, or Regularized MSET (RMSET).

Those skilled in the art will appreciate that MSET incurs a higher computational cost than SPRT. As a result, the filtering of telemetry data using SPRT in filtering apparatus 302 prior to computationally intensive analysis using MSET in analysis apparatus 304 may allow telemetric signals 210 to be analyzed and understood by fault-monitoring module 220 in a manageable and efficient fashion.

Furthermore, the source(s) of the statistical deviation may allow a remedial action to be performed on the monitored computer system(s). More specifically, the remedial action may involve correcting one or more faults in the monitored computer system(s) corresponding to the source(s) of the statistical deviation, generating a replacement signal to maintain normal operation in the computer system, and/or identifying a degradation mode of the computer system. For example, anomalous behavior recorded from a sensor may be resolved by filtering apparatus 302 and/or analysis apparatus 304 as a degrading component monitored by the sensor. The anomalous behavior may thus be remedied by replacing a degrading component causing the anomalous behavior. Alternatively, the anomalous behavior may be caused by a fault in the sensor. As a result, the operation of the component may be maintained by generating replacement signals in lieu of the sensor's faulty signals and/or by replacing the faulty sensor.

Figure 4:
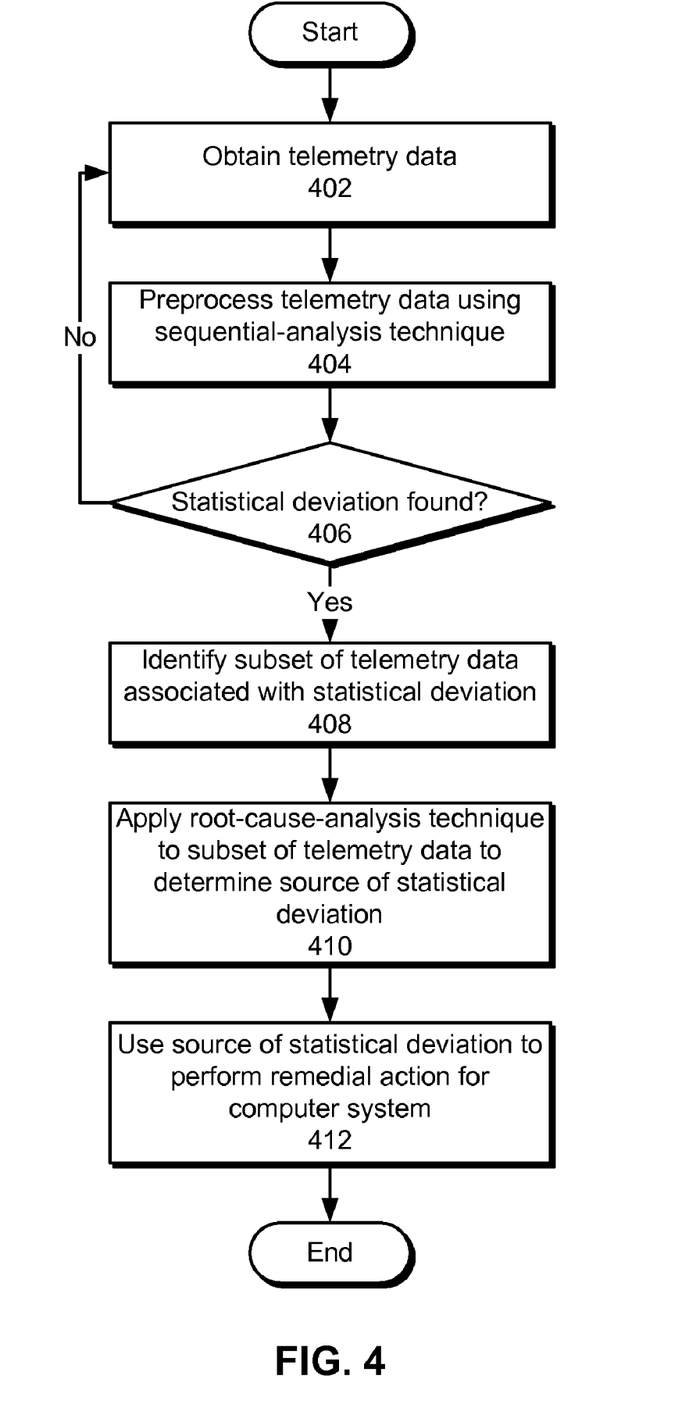
FIG. 4 shows a flowchart illustrating the process of analyzing telemetry data from a computer system in accordance with an embodiment.

FIG. 4 shows a flowchart illustrating the process of analyzing telemetry data from a computer system in accordance with an embodiment. In one or more embodiments, one or more of the steps may be omitted, repeated, and/or performed in a different order. Accordingly, the specific arrangement of steps shown in FIG. 4 should not be construed as limiting the scope of the technique.

Initially, the telemetry data is obtained (operation 402) from the computer system. In particular, the telemetry data may be collected by a set of sensors on the computer system, stored in one or more buffers, and/or compressed into a set of summary statistics. In addition, the telemetry data may include a load metric, a CPU utilization, an idle time, a memory utilization, a disk activity, a transaction latency, a temperature, a voltage, a fan speed, and/or a current.

Next, the telemetry data is preprocessed using a sequential-analysis technique (operation 404). As described above, the sequential-analysis technique may correspond to SPRT. The sequential-analysis technique may be used to detect a statistical deviation (operation 406) in the telemetry data. In particular, the statistical deviation may be indicated by a frequency of alerts generated by the SPRT beyond a missed-alarm probability. On the other hand, a lack of statistical deviation may be indicated by a frequency of alerts generated by the SPRT below a false-alarm probability. If no statistical deviation is found, telemetry data is continually obtained (operation 402) and preprocessed (operation 404) to verify normal functioning in the computer system.

If a statistical deviation is found (operation 406), the subset of telemetry data associated with the statistical deviation is identified (operation 408). The subset of telemetry data may correspond to the telemetry data spanning the time during which the statistical deviation is observed. For example, the subset of telemetry data may include the time during which the SPRT alert frequency is over the missed-alarm probability, as well as the time during which the SPRT alert frequency is between the false-alarm probability and the missed-alarm probability (e.g., the indifference region).

Next, a root-cause-analysis technique is applied to the subset of the telemetry data to determine a source of the statistical deviation (operation 410). As mentioned previously, the root-cause-analysis technique may correspond to MSET, which is higher in computational cost than SPRT. As a result, MSET may only be used when a statistical anomaly is detected in the telemetry data by SPRT. The source of the anomaly may then be determined from residuals obtained from the MSET.

The source of the statistical deviation may then be used to perform a remedial action for the computer system (operation 412). The remedial action may involve correcting a fault in the computer system corresponding to the source of the statistical deviation, generating a replacement signal to maintain normal operation in the computer system, and/or identifying a degradation mode of the computer system.

Figure 5:
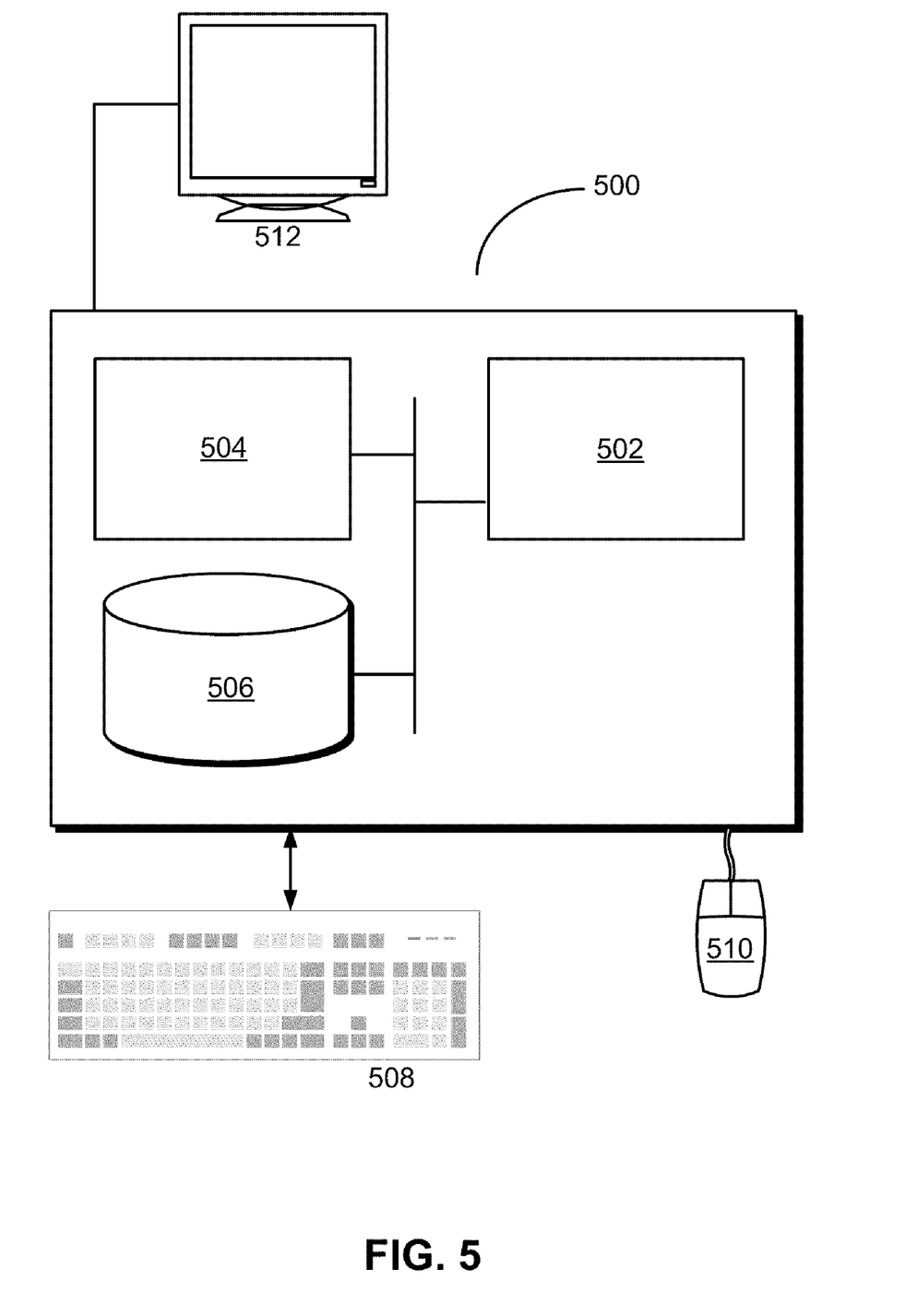
FIG. 5 shows a computer system.

FIG. 5 shows a computer system 500. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In particular, computer system 500 may implement a fault-monitoring module that analyzes telemetry data from a computer system. The fault-monitoring module may include a filtering apparatus that preprocesses the telemetry data using a sequential-analysis technique to detect a statistical deviation in the telemetry data. The fault-monitoring module may also include an analysis apparatus that applies a root-cause analysis to the telemetry data to determine a source of the statistical deviation and uses the source of the statistical deviation to perform a remedial action for the computer system.

In addition, one or more components of computer system 500 may be remotely located and connected to the other components over a network. Portions of the present embodiments (e.g., monitoring mechanism, fault-monitoring module, filtering apparatus, analysis apparatus, etc.) may also be located on different nodes of a distributed system that implements the embodiments. For example, the present embodiments may be implemented using a cloud computing system that provides a remote monitoring and analysis framework for a set of computer servers.

The foregoing descriptions of various embodiments have been presented only for purposes of illustration and description. They are not intended to be exhaustive or to limit the present embodiments to the forms disclosed. Accordingly, many modifications and variations will be apparent to practitioners skilled in the art. Additionally, the above disclosure is not intended to limit the present embodiments.

What is claimed is:

1. A computer-implemented method for analyzing telemetry data from a computer system, comprising:
   periodically obtaining the telemetry data from the computer system;
   preprocessing the telemetry data using a sequential-analysis technique, wherein the sequential-analysis technique is a sequential probability ratio test;
   detecting a statistical deviation in the telemetry using the sequential analysis technique;
   in response to the detection,
      identifying a subset of the telemetry data associated with the statistical deviation,
      applying a root-cause-analysis technique to the subset of the telemetry data to determine a source of the statistical deviation, wherein the root-cause-analysis technique is a multivariate state estimation technique, and
      using the source of the statistical deviation to perform a remedial action for the computer system, which involves correcting a fault in the computer system corresponding to the source of the statistical deviation.

2. The computer-implemented method of claim 1, wherein the computer-implemented method is performed by a service processor associated with the computer system.

3. The computer-implemented method of claim 1, wherein applying the sequential-analysis technique to the subset of the telemetry data involves:
   analyzing a set of summary statistics obtained from the telemetry data.

4. The computer-implemented method of claim 1, wherein the root-cause-analysis technique is associated with a higher computational cost than the sequential-analysis technique.

5. The computer-implemented method of claim 3, wherein the source of the statistical deviation is determined from one or more residuals produced from the multivariate state estimation technique.

6. The computer-implemented method of claim 1, wherein the telemetry data comprises at least one of:
   a load metric;
   a CPU utilization;
   an idle time;
   a memory utilization;
   a disk activity;
   a transaction latency;
   a temperature;
   a voltage;
   a fan speed; and
   a current.

7. The computer-implemented method of claim 1, wherein using the source of the statistical deviation to perform the remedial action for the computer system additionally involves at least one of:
   generating a replacement signal to maintain normal operation in the computer system; and
   identifying a degradation mode of the computer system.

8. A system for analyzing telemetry data from a computer system, comprising:
   a processor;
   a monitoring mechanism configured to periodically obtain the telemetry data from the computer system;
   a filtering apparatus configured to detect a statistical deviation in the telemetry data using a sequential-analysis technique, wherein the sequential-analysis technique is a sequential probability ratio test; and
   an analysis apparatus configured to, in response to the detection:
      identify a subset of the telemetry data associated with the statistical deviation;
      apply a root-cause-analysis technique to the subset of the telemetry data to determine a source of the statistical deviation, wherein the root-cause-analysis technique is a multivariate state estimation technique; and
      use the source of the statistical deviation to perform a remedial action for the computer system, which involves correcting a fault in the computer system corresponding to the source of the statistical deviation.

9. The system of claim 8, wherein applying the sequential-analysis technique to the subset of the telemetry data involves:
   analyzing a set of summary statistics obtained from the telemetry data.

10. The system of claim 8, wherein the root-cause-analysis technique is associated with a higher computational cost than the sequential -analysis technique.

11. The system of claim 9, wherein the source of the statistical deviation is determined from one or more residuals produced from the multivariate state estimation technique.

12. The system of claim 8, wherein the telemetry data comprises at least one of:
   a load metric;
   a CPU utilization;
   an idle time;
   a memory utilization;
   a disk activity;
   a transaction latency;

a temperature;
a voltage;
a fan speed; and
a current.

13. The system of claim 8, wherein using the source of the statistical deviation to perform a remedial action for the computer system additionally involves at least one of:
generating a replacement signal to maintain normal operation in the computer system; and
identifying a degradation mode of the computer system.

14. A computer-readable storage medium storing instructions that when executed by a computer cause the computer to perform a method for analyzing telemetry data from a computer system, the method comprising:
periodically obtaining the telemetry data from the computer system;
preprocessing the telemetry data using a sequential-analysis technique;
detecting a statistical deviation in the telemetry using the sequential analysis technique, wherein the sequential analysis technique is a sequential probability ratio test;
in response to the detection,
identifying a subset of the telemetry data associated with the statistical deviation,
applying a root-cause-analysis technique to the subset of the telemetry data to determine a source of the statistical deviation, wherein the root-cause-analysis technique is a multivariate state estimation technique, and
using the source of the statistical deviation to perform a remedial action for the computer system, which involves correcting a fault in the computer system corresponding to the source of the statistical deviation.

15. The computer-readable storage medium of claim 14, wherein the method is performed by a service processor associated with the computer system.

16. The computer-readable storage medium of claim 14, wherein the root-cause-analysis technique is associated with a higher computational cost than the sequential-analysis technique.

* * * * *